(12) United States Patent
Bradford

(10) Patent No.: US 7,231,737 B2
(45) Date of Patent: Jun. 19, 2007

(54) HUNTING DECOY DEVICE

(76) Inventor: James Bradford, 24323 S. Cowger Rd., Peculiar, MO (US) 64078

( * ) Notice: Subject to any disclaimer, the term of this patent is extended or adjusted under 35 U.S.C. 154(b) by 131 days.

(21) Appl. No.: 10/966,997

(22) Filed: Oct. 15, 2004

(65) Prior Publication Data

US 2005/0081422 A1    Apr. 21, 2005

Related U.S. Application Data

(60) Provisional application No. 60/511,754, filed on Oct. 16, 2003.

(51) Int. Cl.
A01M 31/06    (2006.01)
(52) U.S. Cl. ............................................................. 43/2
(58) Field of Classification Search .................. 43/2, 43/3; 446/330, 376
See application file for complete search history.

(56) References Cited

U.S. PATENT DOCUMENTS

| | | | |
|---|---|---|---|
| 2,663,108 A * | 12/1953 | Dixon et al. ...................... 43/3 |
| 5,231,780 A * | 8/1993 | Gazalski ........................... 43/3 |
| 5,289,654 A | 3/1994 | Denny ............................... 43/2 |
| 5,459,958 A | 10/1995 | Reinke ............................. 43/2 |
| D398,697 S | 9/1998 | Scordo ...................... D22/125 |
| 5,884,427 A | 3/1999 | Lenz ................................. 43/2 |
| 6,070,356 A | 6/2000 | Brint ................................ 43/2 |
| 6,092,322 A | 7/2000 | Samaras .......................... 43/2 |
| 6,212,816 B1 | 4/2001 | Rabbitt ............................ 43/3 |
| 6,481,147 B2 | 11/2002 | Lindaman ........................ 43/2 |
| 6,487,810 B1 | 12/2002 | Loughman ....................... 43/2 |
| 6,684,552 B1 | 2/2004 | Anders, III ...................... 43/2 |
| 6,708,440 B2 | 3/2004 | Summers et al. ................ 43/2 |
| 6,775,943 B2 | 8/2004 | Loughman ....................... 43/2 |
| 2004/0250461 A1* | 12/2004 | Dryer ............................... 43/2 |
| 2005/0138855 A1* | 6/2005 | Jensen ............................. 43/3 |

* cited by examiner

Primary Examiner—Kimberly S. Smith

(57) ABSTRACT

The present invention comprises a gaming decoy device for use, for example, with hunting wild turkey. The device includes a slide which is moveably mounted to a keeper. When the slide moves relative to the keeper, tail feathers are moved back and forth from a prone position to an upright position. The feathers may be moved to and from any position between the prone and upright positions.

9 Claims, 5 Drawing Sheets

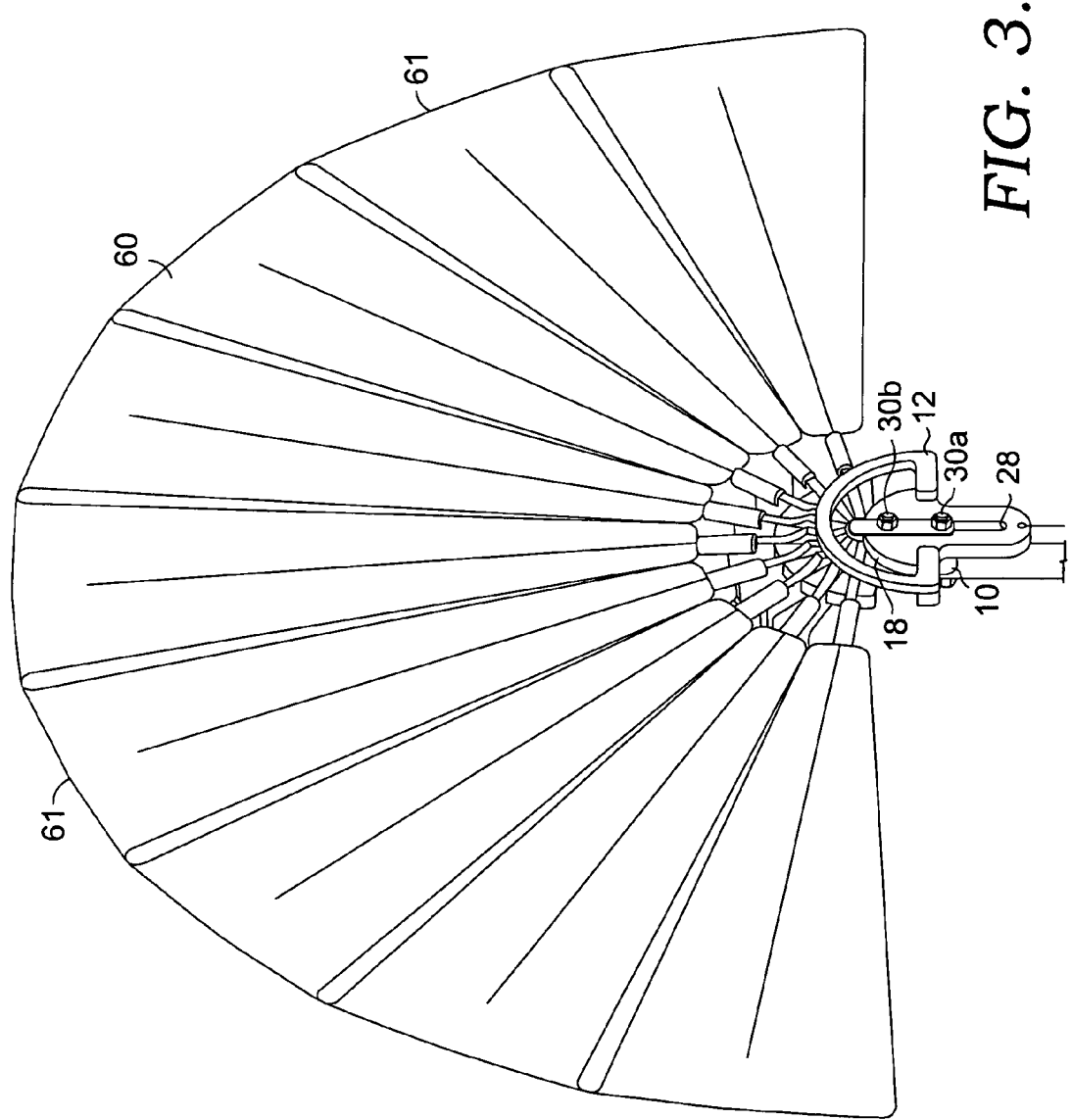

HUNTING DECOY DEVICE

CROSS-REFERENCE TO RELATED APPLICATIONS

This application claims the benefit of U.S. Provisional Application No. 60/511,754 filed Oct. 16, 2003.

STATEMENT REGARDING FEDERALLY SPONSORED RESEARCH OR DEVELOPMENT

None.

BACKGROUND OF THE INVENTION

1. Field of the Invention

This invention relates generally to gaming and observation of animals. In particular, it relates to a decoy mechanism which emulates life like movements of wild turkey. The invention comprises a device which mimics the movement of tail feathers of a live turkey from a prone or generally horizontal configuration to an upright or generally vertical configuration.

2. Discussion of the Related Art

Turkey decoys have been produced in many forms and fall primarily under two categories: static decoys and motion decoys. The primary intent of both types of decoys is to attract a live turkey for observation or hunting purposes.

Stationary or static decoys represent the general shape, size, color and feather pattern of a live turkey. These decoys are placed in an open area and used to attract a wild turkey, which may be passing by. These decoys are very basic and rely on the ability of a passing turkey to recognize the shape as a fellow turkey.

The second category employs motion to imitate the movements of a live turkey. The movements of the decoy are used to catch the attention of a passing turkey. The motions of the decoys are usually an attempt to mimic either one or more motions of a live turkey. The movement of these decoys is sometimes as simple as placing a static decoy on a pivot point which allows the wind to move the decoy side to side, or rock back and forth. The wind induced motion decoy is one of the simplest and most popular. U.S. Pat. No. 6,092,322 shows an example of wind-induced movements of a turkey decoy. The motion of the wind induced motion decoys is highly unpredictable and erratic.

The motion of some decoys can be initiated by an operator with a manual pull string, push rod or electrical motor. The manual activation capability gives the operator the advantage of triggering the decoy's movement at an opportune time rather than relying on the randomness of the wind. Some motion decoys use a mechanical device that produces random movement of the decoy. Such a device is disclosed in U.S. Pat. No. 6,070,356. The use of random movement does not consistently give a level of certainty needed to attract a live turkey. The movement may occur when the live turkey is out of sight or they may occur too often when a turkey is close and frighten the turkey away.

During the mating season the wild male turkey will display its tail feathers by spreading them into a semi-circular fan shape as part of the mating strut. The tail feathers begin in a prone or close to horizontal position behind the bird and then rise vertically while simultaneously spreading into a fan shape. This action is done to demonstrate the dominance of the male turkey and thus convince a female to mate with him. The female turkey is attracted to the sight of the male turkeys fantail. Because of their competitive nature it has also been observed that male turkeys will also be attracted to the fan tail display. The males will compete for a hen by trying to out strut their fellow turkeys and/or by sparing. The sight of a strutting male will excite and irritate a fellow male turkey. The male turkey then will engage the competitor and attempt to drive them off or try to out strut them. If a male turkey has already gathered a group of females it is very difficult to draw him away from their company. The sight of a competing male turkey that may steal his mates is one of the few things that will pull him away from his group of females.

The present invention mimics in detail the fanning motion of a live male turkeys tail. This motion will take the tail feathers from the reclined (or horizontal), natural position of the tail to an upright or vertical position. The movement of the present invention can be controlled fully throughout the entire motion of the device. This means that the tail can be opened to any given point of the fanning process. This feature will allow the operator to give the decoy a realistic movement and less dominant appearance when necessary.

The present invention provides a simple and effective way to improve upon existing static decoys by adding apparent motion. This device can be positioned behind a stationary decoy to give it the advantages of a motion style decoy as well as the appearance of a strutting male turkey. The drawings constitute a part of this application and include exemplary embodiments of the present invention and illustrate various features thereof.

BRIEF SUMMARY OF THE INVENTION

The present invention, is a decoy device which comprises a slide, a keeper, and a plurality of decoy members. The decoy members (which in one embodiment resemble feathers) are pivotally attached to and extend from notches in the keeper. Decoy members pivot about an arcuate pin. As the slide moves in a first direction relative to said keeper, the decoy members move from a generally collapsed and gathered position to a fully extended position. When the slide is moved in a second direction, the decoy members are collapsed again.

BRIEF DESCRIPTION OF THE DRAWINGS

FIG. 3 is a front, elevational view of a tail fan of the hunting device of FIG. 1a showing the tail fan in an upright or open position.

FIGS. 4a and 4b are fragmentary, sectional views of a keeper and a slide of the hunting device of FIG. 1a. FIG. 4a shows the configuration of the keeper and the slide with the tail feathers in the prone or horizontal position. FIG. 4b shows the configuration of the keeper and the slide with the tail feathers in the upright or vertical position.

DETAILED DESCRIPTION OF THE PREFERRED EMBODIMENTS

Figure 1:
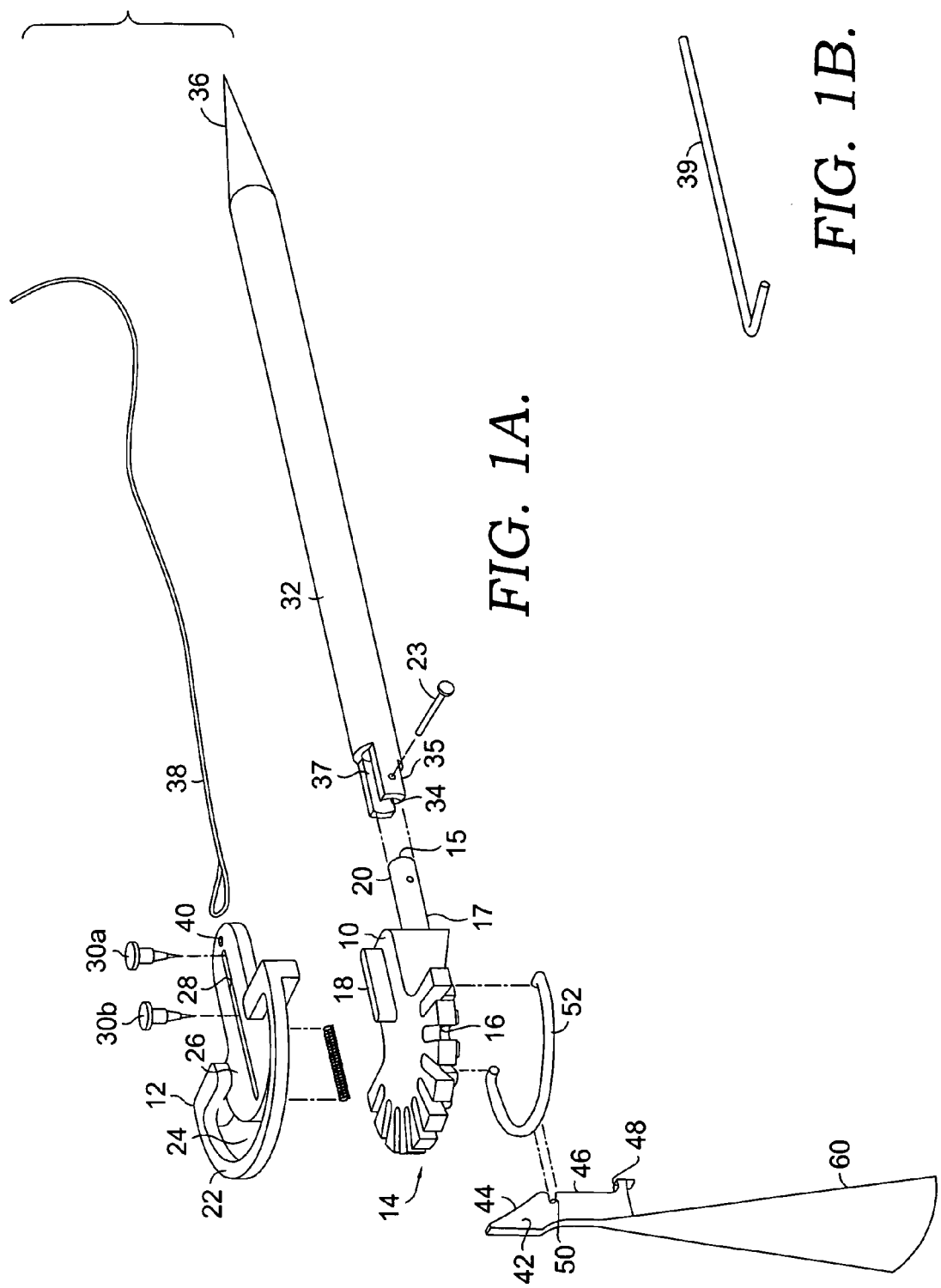
FIG. 1a is an exploded, perspective view of an embodiment of the hunting device of the present invention.
FIG. 1b shows an L-shaped snare which is an alternative means for activating the hunting device.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

Referring to the drawings in greater detail, FIG. 1a shows an exemplary embodiment of the hunting device of the present invention. The device includes a keeper (10) and a slide (12). The keeper (10) and slide (12) may be fabricated from any of a number of known materials including metals, wood, composite materials, etc.

The keeper (10) includes a front face and a rear face and a generally semicircular upper portion (14) having a plurality of notches (16) formed along an outer perimeter thereof. The keeper (10) also includes a raised block (18) formed along a lower portion thereof, and includes a knob (20) extending from the base of the keeper (10).

The slide (12) includes a front face and a rear face and a generally semicircular rim (22) which defines an opening (24) formed within the perimeter of the rim. The slide (12) also includes a base portion (26) having a longitudinal slot (28) formed therein. The slot (28) is sized to receive the block (18) when the slide (12) is mounted in a face-to-face abutting relationship with the keeper (10) as discussed more below. The configuration of the block (18) and knob (20) could, however, easily be reversed such that the knob extends from the slide (12) and the slot is formed in the keeper (10).

A stake (32) having a central bore (34) is provided and sized to receive knob (20). Proximate bore (34), an upper removed portion (37) and a lower removed portion (35) together allow the entire slider (12) and keeper (14) assembly to be tilted relative to the stake (32). This enables decoy members (60) to be folded in. When this is done, the end (17) of knob (20) will pass through the larger removed portion (37) and another portion (15) of knob (20) will be received in the lower removed portion (35). Thus, the decoy members (60) when in a collapsed and gathered position may be made proximate and substantially parallel with stake (32). This makes the device easily stored because the members (60) will no longer be sticking out perpendicular to the stake (32), but will be instead, in alignment. This enables the device to be easily stored.

The hinged relationship between stake (32) and keeper (14) must be controlled such that the keeper may be locked in the position shown in FIG. 1a for use, or alternatively locked in position for storage where the feathers (60) are substantially parallel to the stake. This locking may be accomplished in different ways. First, the fastener (23) may comprise a screw, bolt, or be force fit such that the keeper is so tightly held that it may be pivoted, but enough resistance is provided that when it is placed in its upright (shown) or storage (not shown) positions it will remain in place unless forcibly acted on by the user. Alternatively, a latch system could be provided where the end of the stake has a latch which engages the engaged face of the keeper. In this alternative arrangement, the keeper would be snapped into place and unsnapped by force.

Stake (32) includes a pointed end (36). Pointed end (36) allows the device to be easily secured into a ground surface.

Figure 2:
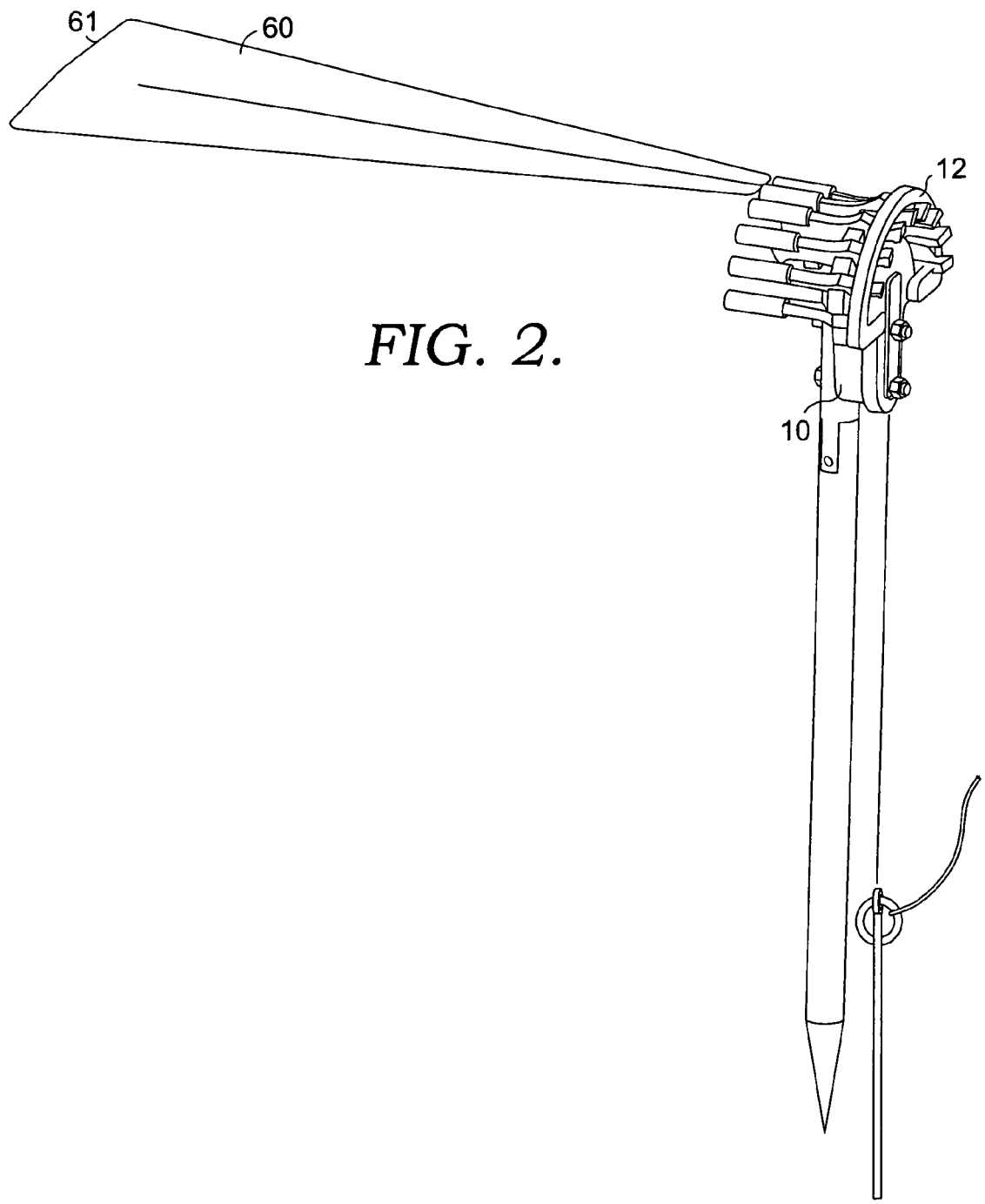
FIG. 2 is a perspective view of the assembled hunting device of FIG. 1a, showing a representative tail feather thereof in a horizontal position.

Referring to FIG. 2 and FIG. 3, the keeper (10) is mounted in face-to-face abutting relationship with the block-shaped guide protrusion (18) positioned within longitudinal slot (28). Protrusion (18) and slider (12) together define a slide path of said slider (12) relative to said keeper (10). Pins (30a, 30b) are used to slideably secure the keeper (10) to the slider (12). The pins (30a 30b) also serve to limit the movement of the slide (12) relative to the keeper (10) as discussed more below.

Referring to FIG. 1a, a string or rope (38) is secured to an opening (40) in the slide (12), and is used to actuate the device as discussed more below. The rope (38) can be inserted through guide stakes (not shown) so the operator can move an appropriate distance away. Though this embodiment shows the use of a string or rope being used to activate the device, other means, such as a cable, or a rigid elongated member which is hinged or otherwise fixed near or at the location of opening (40). Yet another possibility is the use of an L-shaped snare (39) as seen in FIG. 1b which is placed, possibly even secured within hole (40) to activate the slide in two possible directions. Other means of activating slide (12) could be used as well and still fall within the scope of the present invention.

Referring to FIGS. 1–4, a plurality of feather tangs, (42) are mounted to the keeper (10). The tangs (42) include an incline surface (44), a generally vertical surface (46), a notch (48), and a generally circular-shaped bore (50) through a central portion of the tang (42). The bore (50) is sized to receive an annular pin (52) to pivotally secure the tang (42) to the keeper (10).

Figure 4A:
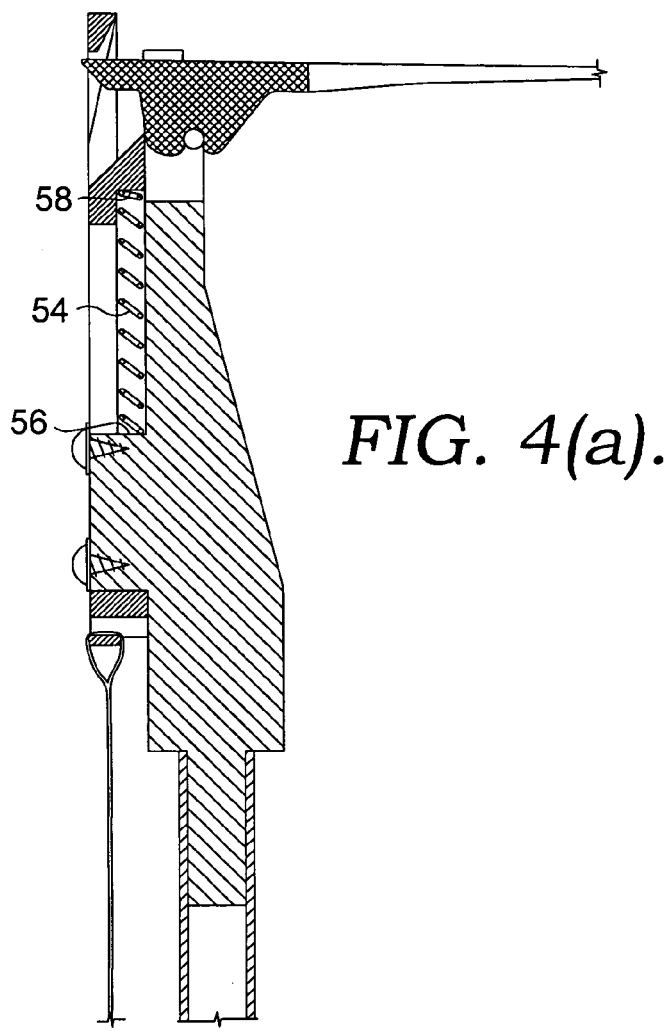
Figure 4B:
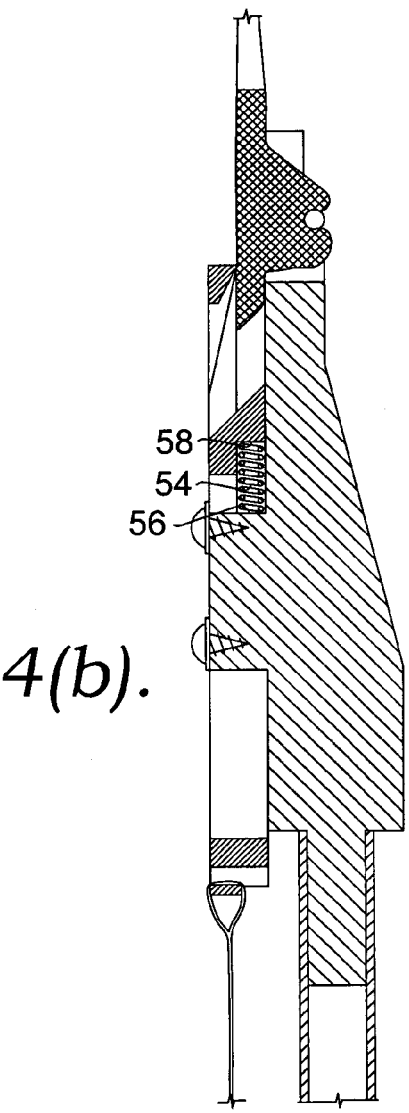

Referring to FIGS. 4a and 4b, in operation the keeper (10) is moveably secured to the slide (12) with a spring (54) positioned between an edge (56) of the block (18) and an edge (58) of the slide (12).

Referring to FIGS. 4a and 4b, the device is movable from a first collapsed and gathered position depicted in FIG. 4a with the spring (54) in a relaxed position with a plurality of decoy members, or feathers (60) in a prone, generally horizontal, gathered position as depicted in FIG. 2. The spring (54) trapped between a front terminus (58) of slot (28) and a forward face (56) of protrusion (18). Though not shown, the slot (28) is somewhat enlarged to accommodate spring (54) underneath. The smaller size of the shown part of slot (28) in FIG. 1a maintains the spring so that it does not come out the top. When collapsed and gathered as shown in FIG. 2, the decoy member tips (61) will be in relative close proximity to one another.

The plurality of decoy members (60) may be actual feathers, but more likely, as shown here, will be artificial feathers composed of some sort of rigid or slightly flexible material. One or both faces of each feather may include decorative patterns which mimic the appearance of an actual turkey feathers.

Referring to FIG. 4b, when a user manually applies tension or pulls on the rope (38), the slide (12) moves generally downward relative to the keeper (10), causing the rim portion of the slide (12) to engage the end of the tang (42) and thereby cause the tang (42) to move radically about the pin (52) which causes the feathers (60) to extend to a generally upright, vertical, fully divergent, radiated position as depicted in FIG. 3. When in fully divergent radiated position as shown in FIG. 3, the feather tips (61) will be at a maximum distance tangentially from one another.

Once in divergent position, the spring (54) will be in compression. When the line (38) is pulled released, the spring (54) biases the keeper (10) and the slide (12) to their original configurations depicted in FIG. 4a and FIG. 2. A plurality of tensioning devices such as rubber bands (not shown) can also be attached to the tangs at one end to the notches (48) and at another end to a fixed point on the device to provide additional biasing if necessary for environmental conditions, e.g., high winds.

As is apparent from the foregoing discussion, the device is moveable from a first position where the feathers are generally horizontal and gathered to a second position where the feathers extend generally vertically and are spread.

Figure 5:
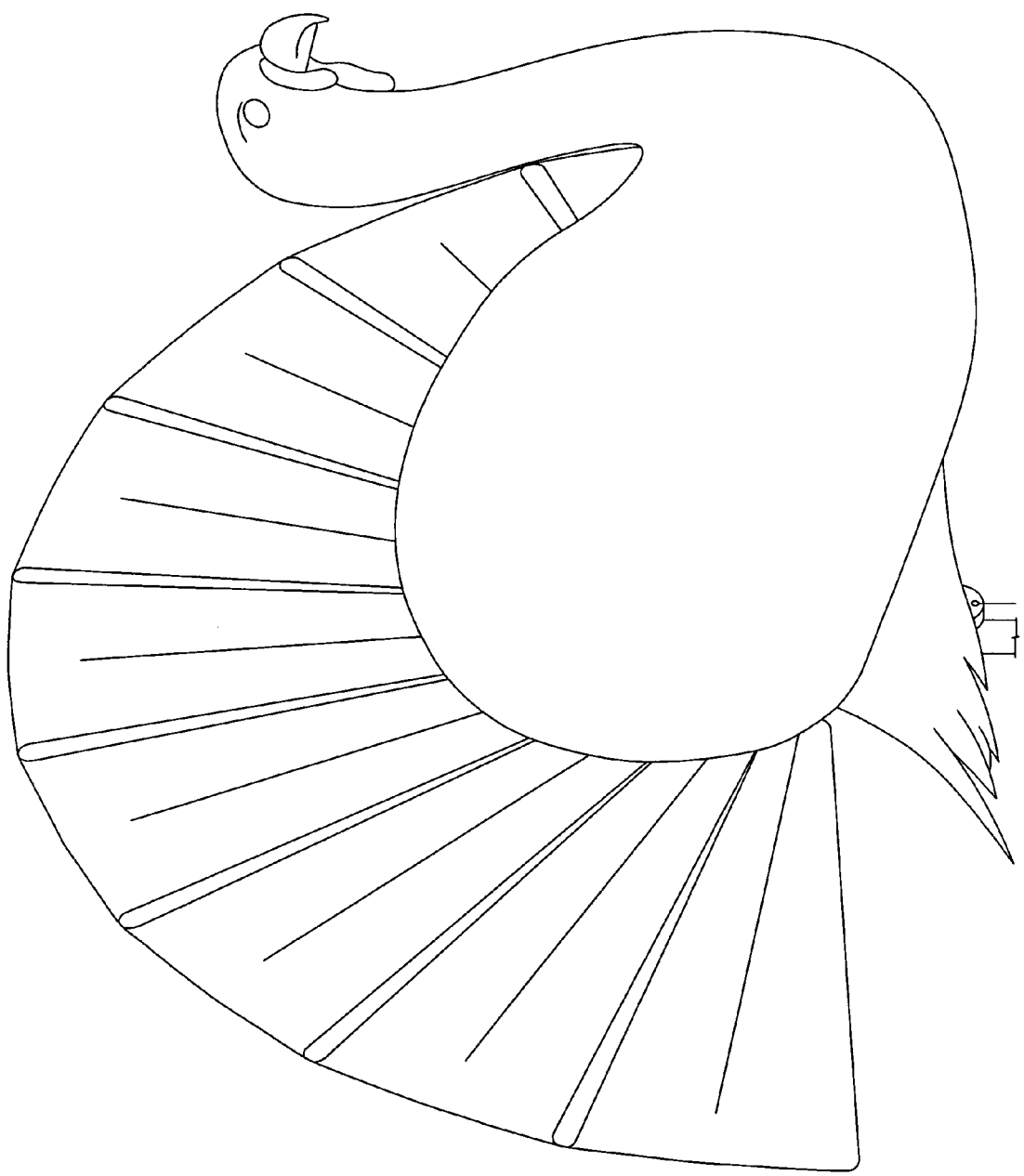
FIG. 5 shows the fan tail of the present invention in use with a decoy body disposed in front.

FIG. 5 shows how the decoy will appear when in this second spread position (see also FIG. 3) when a turkey body is disposed in front of the feather array to complete the decoy.

The natural looking motion of the device will give a stationary turkey decoy the appearance of a live moving (strutting) turkey. The motion of the device is such that the operator can control the speed and the amount of motion thus adding to the realism of the motion.

Depending upon the amount of movement feathers (60) that is desired, the operator can pull on the rope (38) to move the feathers between the prone position and the vertical position and can stop the movement of the feathers at any position therebetween by applying an appropriate amount of tension to the rope (38).

For example, the operator could move the feathers (60) from the initial prone position through 45° rotation to a position approximately midway between the horizontal and vertical configurations by applying an appropriate amount of tension the rope (38). When the operator releases or reduces the amount of tension to the rope (38), the spring will bias the feathers toward the prone position. The operator can easily move the feathers (60) back and forth between any positions between the horizontal and vertical configurations. The operator can move the feathers (60) rapidly or slowly depending upon the desired result.

The present invention can also be easily be configured for automotive operation by utilizing known devices for applying tension to the line (38) or by otherwise causing direct movement of the slide (12) relative to the keeper (10).

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A decoy device, comprising:
a slide;
a keeper;
a plurality of decoy members pivotally attached to and extending from said keeper;
said decoy members moveable from a generally collapsed position to an extended position as said slide moves in a first direction relative to said keeper; and
said decoy members being pivotally attached to said keeper using each of a plurality of notches defined by said keeper to receive an innermost end of each of said decoy members, said innermost end of said decoy member defining a tang which includes a bore which is sized to receive an annular pin, said pin defining a pivot point for said decoy member.

2. The device of claim 1 wherein said notches are dispersed about a semicircular portion of said keeper.

3. The device of claim 1 wherein:
said innermost end is received in an opening defined in a rim, said rim engaging a portion of said tang to pivot said decoy member about said pin.

4. The device of claim 1 comprising:
a portion of said slider including a slot which engages a first end of an elastic compression member;
a second end of said compression member being engaged by a forward surface of a protrusion on said keeper to effectively sandwich said compression member;
said compression member serving to compel said decoy member back into collapsed position after it has been activated.

5. The device of claim 4 wherein said compression member is a spring.

6. A decoy device, comprising:
a keeper;
a substantially arcuate upper portion on said keeper, said upper portion on said keeper also defining a plurality of notches, each of said notches pivotally receiving each of a plurality of decoy members such that said decoy members are separately pivotally attached about said substantially arcuate upper portion, each member having a independent pivot axis about said substantially arcuate upper portion, each independent pivot axis enabling each of said decoy members to be moveable to a forward generally collapsed position wherein said members are located substantially parrallel and in close proximity to each other, and then radiate back and outward to a substantially extended position.

7. The device of claim 6 wherein:
each of said decoy members pivots about a semicircular curved pin which is received by a notch in an inner end of each of said decoy members.

8. The device of claim 6 comprising:
a hinge between said keeper and a stake, said binge enabling said decoy members to be moved to be substantially parallel and proximate to said stake when said decoy members are in said collapsed position.

9. A decoy device, comprising:
a semicircular hinge arrangement on said decoy device;
a plurality of decoy members, each of said decoy members being located in a corresponding notch defined in a substantially arcuate upper portion of a keeper on said decoy device to create said semicircular hinge arrangement, said hinge arrangement enabling said decoy members to mimic a birds feathers in (i) a gathered position, and (ii) in a spread position.

* * * * *